US 6,689,532 B1

(12) United States Patent
Wexler et al.

(10) Patent No.: US 6,689,532 B1
(45) Date of Patent: Feb. 10, 2004

(54) METHOD OF PROTECTING AN IMAGE RECEIVING LAYER OF A RECORDING ELEMENT PRIOR TO AND AFTER PRINTING

(75) Inventors: Allan Wexler, Pittsford, NY (US); David J. Collett, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/368,163

(22) Filed: Feb. 18, 2003

(51) Int. Cl.⁷ .................. G03C 11/12; B32B 31/00; B44C 1/165; B41J 3/00; B41J 2/01
(52) U.S. Cl. .............. 430/201; 430/237; 430/256; 156/235; 156/249; 347/2; 347/104; 347/105
(58) Field of Search .................. 430/256, 237, 430/248, 201; 347/2, 105, 104; 156/249, 235

(56) References Cited

U.S. PATENT DOCUMENTS

| 2,813,052 A | 11/1957 | Lancaster |
| 3,039,907 A | 6/1962 | Scholl |
| 3,442,742 A | 5/1969 | Jorgensen |
| 4,495,016 A | 1/1985 | Viberg et al. |
| 5,201,976 A | 4/1993 | Eastin |
| 5,363,179 A | 11/1994 | Cahill et al. |
| 5,414,502 A | 5/1995 | Cahill et al. |
| 5,475,480 A | 12/1995 | Cahill et al. |
| 5,483,321 A | 1/1996 | Cahill et al. |
| 5,795,425 A | 8/1998 | Brault et al. ............. 156/235 |
| 5,855,722 A | 1/1999 | Osaka ....................... 156/277 |
| 6,130,024 A | 10/2000 | Aylward et al. ........... 430/256 |

FOREIGN PATENT DOCUMENTS

JP    00 135856 A    5/2000

*Primary Examiner*—Richard L. Schilling
(74) *Attorney, Agent, or Firm*—William R. Zimmerli (57) ABSTRACT

A method of producing a laminated image on a receiver is provided. The method includes providing a recording element comprising an unimaged image receiving layer having a removable protective laminate adhered to the unimaged image receiving layer; and transferring the removable protective laminate to an imaged image receiving layer. The imaged image receiving layer can be the former unimaged receiving layer after the layer has been printed. Alternatively, the imaged image receiving layer can be from a second recording element having an image receiving layer after that image receiving layer has been printed.

37 Claims, 3 Drawing Sheets

METHOD OF PROTECTING AN IMAGE RECEIVING LAYER OF A RECORDING ELEMENT PRIOR TO AND AFTER PRINTING

FIELD OF THE INVENTION

This invention relates generally to a recording element used in printing and, more particularly, to protecting the image receiving layer of the recording element prior to and after printing.

BACKGROUND OF THE INVENTION

Inkjet prints, prepared by depositing ink drops onto inkjet recording elements, are subject to environmental degradation. These prints are especially vulnerable to damage resulting from contact with water and atmospheric gases such as ozone. The damage resulting from the post imaging contact with water can take the form of water spots resulting from deglossing of the top coat; dye smearing due to unwanted dye diffusion; and/or even gross dissolution of the image recording layer. Ozone bleaches inkjet dyes resulting in loss of density thereby reducing the lifetime of the prints. To overcome these deficiencies, inkjet prints are often laminated. However, conventional lamination processes require a separate roll of laminate material that is applied over the image only after the image has been printed onto the inkjet recording element, and thereby afford no protection to the element prior to printing, leaving the element vulnerable to handling and environmental damage For example, Japanese Unexamined Patent Publication 2000-135856 A relates to a recording medium and a method for inkjet printing wherein a protective layer is simultaneously removed from a backside of an unprinted recording media and applied to a frontside of a printed recording media. This process is disadvantaged in that the image receiving layer of the recording media is left unprotected prior to printing.

U.S. Pat. No. 5,201,976, issued to Eastin, on Apr. 13, 1993, discloses a method of making a laminated adhesive label from rolls of a first composite having the following structure: paper, adhesive, and plastic film. A roll of the first composite is unwound and the paper is printed. An adhesive is then coated over the printed paper. A second roll of the plastic film from a previously exhausted roll of the first composite is transferred onto the printed paper now bearing the adhesive creating a second composite having the following structure: plastic film, paper, adhesive, and plastic film. The plastic film is then stripped from the second composite to provide the label having the following structure: plastic film, paper, and adhesive and the second roll (the previously exhausted roll of the first composite). Alternatively, the plastic film from the first composite (referred to as a release liner) is redirected via a set of rollers to the printed paper surface of the first composite without being collected. This process is disadvantaged in that an adhesive must be applied to the surface of the printed image in order to adhere the plastic film to the paper.

U.S. Pat. No. 4,495,016, issued to Viberg et al., on Jan. 22, 1985, discloses a method of making sterile tubes from rolls of a composite having the following structure: plastic layer 1, plastic layer 2, and paper. A roll of the composite is unwound and plastic layer 1 is removed and, after passing through a series of rollers, is reattached via a heat seal onto the back surface of the paper creating a reconfigured composite having the following structure: plastic layer 2, paper, and plastic layer 1. The top surface of plastic layer 2 remains sterile throughout the process. The reconfigured composite is then sealed thermally along its bottom and longitudinal edges creating the aseptic tube. Alternatively, the roll of composite is unwound and passed through a series of rollers so that the web of material winds back such that plastic layer 1 contacts the back paper surface of the web of material. The transfer of plastic layer 1 then takes place as described above. This method is disadvantaged because the image receiving layer of the recording media is left unprotected prior to printing, and is thereby vulnerable to mechanical abrasion and contamination.

An object of this invention is to provide a method of making a durable inkjet print using an inkjet recording element that has a transferable laminate (for example, a polymeric film) that is removed from an image receiving layer of the recording element before printing and applied to the image receiving layer of the recording element after printing. Another object of this invention is to provide a method of making a durable inkjet print that minimizes contact of the image receiving layer with the environment both before and after printing. Another object of this invention is to provide a method of making a durable inkjet print that, during the manufacturing process, does not require application of an adhesive.

SUMMARY OF THE INVENTION

According to one feature of the present invention, a method of producing a laminated image on a receiver includes providing a recording element comprising an unimaged image receiving layer having a removable laminate adhered to the unimaged image receiving layer; and transferring the removable laminate to an imaged image receiving layer.

According to another feature of the present invention, a method of producing a laminated image on a receiver includes providing a first recording element comprising an unimaged image receiving layer having a removable laminate contacting the unimaged image receiving layer; providing a second recording element comprising an unimaged image receiving layer; printing an image on the unimaged receiving layer of the second recording element, wherein the unimaged receiving layer of the second recording element becomes an imaged image receiving layer of the second recording element; and transferring the laminate from the unimaged image receiving layer of the first recording element to the imaged image receiving layer of the second recording element.

According to another feature of the present invention, a method of producing a laminated image on a receiver includes providing a parent recording element comprising an image receiving layer having a removable laminate contacting the image receiving layer; providing a daughter recording element comprising an image receiving layer; transferring the laminate from the image receiving layer of the parent recording element to an imaged image receiving layer of the daughter recording element.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
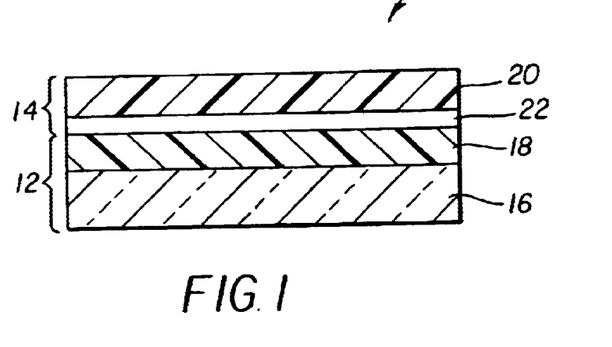
FIG. 1 is a cross sectional view of a web of material incorporating the present invention.

Referring to FIG. 1, a web of material 10 is shown. Web 10 comprises a recording element 12 and a transferable laminate 14. Recording element 12, described in more detail below, includes a support 16 and at least one image receiving layer 18 positioned over the support 16. Support 16 can be transparent or opaque. The at least one imaging receiving layer 18 can be porous, non-porous, or polymeric. Transferable laminate 14, described in more detail below, can include a protective layer 20 (for example, a polymeric film layer) having a thermally activated (commonly referred to in the industry as heat sensitive) adhesive layer 22 contacting one side of the polymeric film layer 20. The thermally activated adhesive layer 22 also contacts the at least one image receiving layer 18. Alternatively, adhesive layer 22 can be activated using pressure (commonly referred to a pressure sensitive adhesive layer) or activated using other suitable means known in the industry. Additionally, the support 16 of the recording element 12 can incorporate or include the image receiving layer 18. In this sense, the recording element 12 would be considered to have only layer.

As used herein, the term transferable laminate means a removable (peelable, etc.) laminate that can, at the user's option under the appropriate operating conditions, be rendered non-removable (permanent, etc.). Accordingly, for example, the degree of adhesion or tack of the thermally activated adhesive used in layer 22 is temperature dependent such that when applied initially, at a relatively low temperature, it adheres but remains removable, whereas when applied at relatively higher temperatures, the level of adhesion is substantially greater so as to become permanently adhered.

Figure 2:
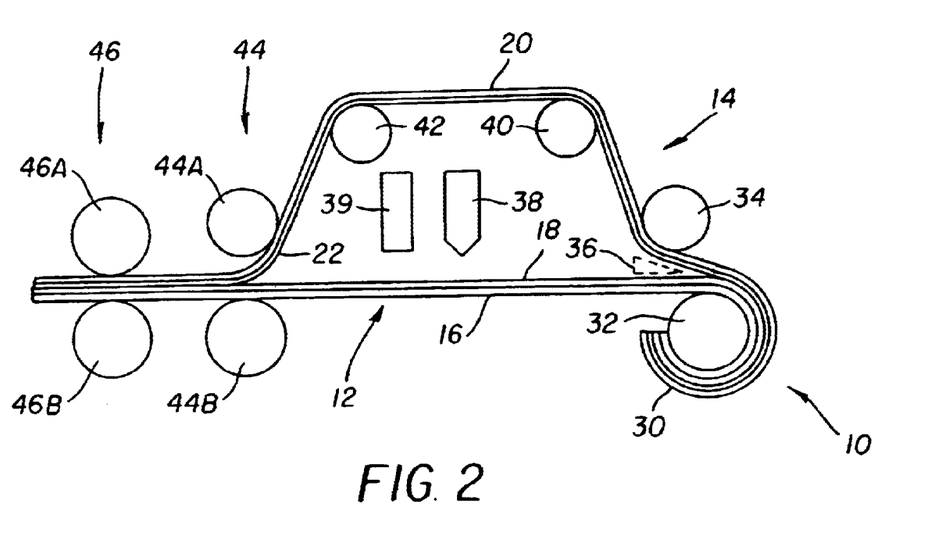
FIG. 2 is a schematic diagram of a first embodiment showing a manufacturing process useable with the material of FIG. 1.
Figure 5:
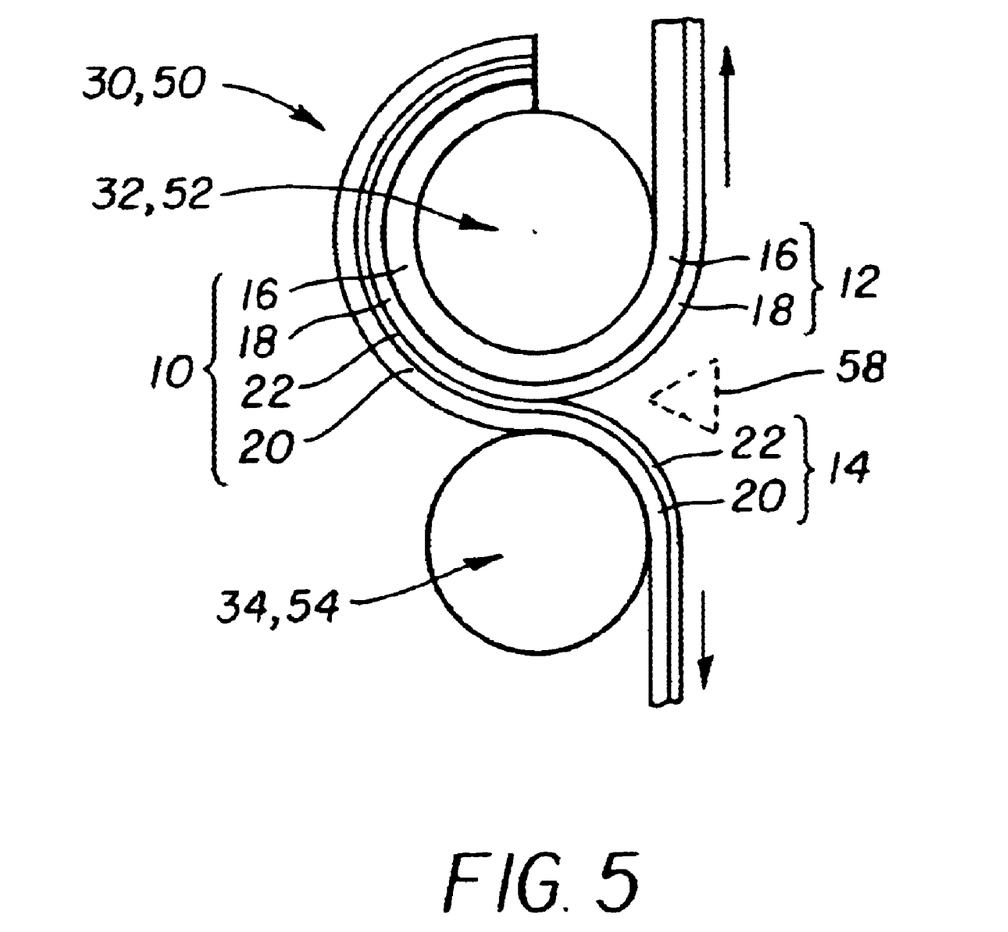
FIG. 5 is an enlarged portion of the embodiments shown in FIGS. 2–4 illustrating the separation of the transferable laminate from the recording element of material web.

Referring to FIGS. 2 and 5, the process begins with the unwinding of material web 10 from a supply roll 30 positioned around a roller 32. The transferable laminate 14 is removed (peeled, etc.) from the unimaged image receiving layer 18 of recording element 12 and caused to travel around roller 34. As such, protective layer 20 provides protection to the image receiving layer 18 of the recording element 12 prior to printing on the image receiving layer 18 of the recording element 12. In some applications, it may be beneficial to include a removal device 36 (knife, blade, wedge, etc.) to assist with the removal of the transferable laminate from the image receiving layer 18.

Recording element 12 travels past one or more print stations 38. Here, image receiving layer 18 receives ink (forming an image) from the one or more printheads (not shown) positioned at each print station 38. Typically, print station(s) 38 will have inkjet printheads. However, other types of printheads can be used, for example, dye sublimation printheads, laser printheads, etc. After traveling past print station(s) 38, recording element 12 can optionally travel past a drying zone(s) 39. Drying zone(s) 39 can be any type known in the industry, for example, heat lamps, ultraviolet dryers, infrared dryers, etc.

During this time, transferable laminate 14 bypasses the one or more print stations 38 traveling around rollers 40 and 42. Transferable laminate 14 is caused to contact the imaged image receiving layer 18 as the laminate 14 and the recording element 12 travel through a laminator assembly 44 (for example, a heated roller assembly 44A and 44B). Here, the temperature of the rollers causes the thermally activated adhesive layer 22 of the transferable laminate 14 to adhere itself to the surface of the image receiving layer 18 such that the protective layer 20 of the transferable laminate 14 becomes non-removable, described in more detail below. As such, the imaged recording element 12 is laminated with the protective layer 20 of the transferable laminate 14.

Alternatively, the laminator assembly 44 can be a pressure roller assembly provided the adhesive layer 22 is a pressure activated adhesive layer. When adhesive layer 22 is pressure activated the degree of adhesion or tack of the pressure activated adhesive used in layer 22 is pressure dependent such that when applied initially, at a relatively low pressure, it adheres but remains removable, whereas when applied at relatively higher pressures, the level of adhesion is substantially greater so as to become permanently adhered.

The thermally activated adhesive layer 22 can be any suitable type of adhesive provided the thermally activated adhesive layer 22 is of the type that is initially removable but can be caused to become non-removable using suitable means. For example, the thermally activated adhesive layer 22 can include a wide variety of different adhesives or blends of adhesives such as polyester thermoplastic adhesives; polyurethane thermoplastic adhesives including polyurethane polyesters and polyurethane polyethers; unsaturated polyester; thermoplastic polyamide adhesives; and/or an acrylic resin, for example, a butyl methacrylate resin, such as ELVACITE.RTM. 2045, which is commercially available from ICI Acrylics Inc., Wilmington, Del. The same can be said for a pressure activated adhesive layer.

After the permanently laminated material web 10 leaves the laminator assembly 44, the material web passes through a cutter assembly 46 which makes a perforated cut perpendicular (or parallel) to the longitudinal axis of the material web 10 at predetermined intervals. These cuts are sufficient to permit easy separation of individual pictures, images, documents, etc. by manual or automated processes. The cutter assembly 46 can be a two roller system in which cuts are made by cutting wheel 46B from the bottom of the material web 10 as the material web 10 is pressed against pressure wheel 46A. Cutter assembly 46 can be positioned either parallel or perpendicular to the material web 10. Alternatively, any known perforating, cutting, or scoring assembly may be used as well as any method for defining when the cuts are made to be material web 10.

The protective layer 20 of the transferable laminate 14 provides protection and/or added functionality to the recording element 12 (image receiving layer 18 and/or support 16). Protective layer 20 can be chosen to provide protection from physical damage, for example, scratches, spills, etc. Protective layer 20 can be selected to provide protection from damaging effects of light, for example, UV light exposure, and atmospheric gases which can cause the image to fade, or the support 16 under the image to crack. This helps to increase the life and durability of the recording element 12. Protective layer 20 can be designed with a fine line or pattern of dots that provides the recording element 12 with anti-copying protection. Protective layer 20 can be chosen to provide a matte or texture to the surface of the recording element 12. The protective layer 20 can be selected to be a transparent or substantially transparent polymer sheet. When the protective layer 20 is a polymer sheet, a matte or textured surface can be incorporated in or on the polymer sheet. Additionally, the polymer sheet can include unique patterns, for example, a border pattern, an artistic brushstroke pattern, a fine line pattern, etc.

Protective layer 20 can include a polymeric film (a polymer sheet, etc.). Any suitable polymer can be used for the transferable (peelable) protective layer 20. Polyolefins, polyesters, polyamides, and others can be used. Additionally, it is desirable to have a polymer layer, for example, a polyolefin and/or a polyester, that does not stretch or has minimal yield to the sheet as a force is applied to remove it from the unimaged image receiving layer 18 of the recording element 12. Polymers that are oriented in at least one direction are the most effective in minimizing stretch and have the greatest versatility in adding additional functionality to an imaging element.

Figure 3:
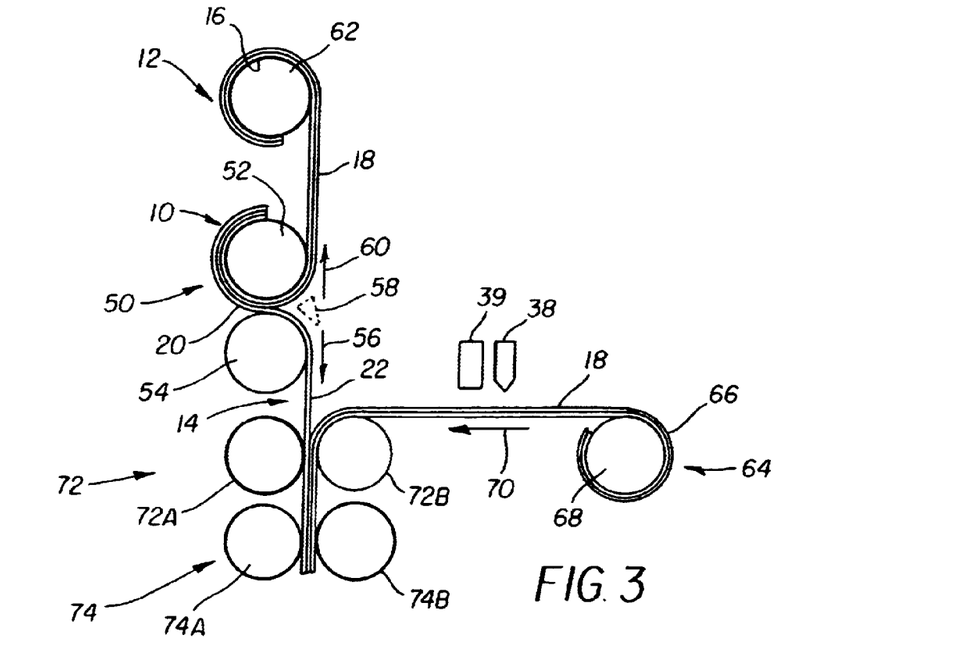
FIG. 3 is a schematic diagram of a second embodiment showing a manufacturing process useable with the material of FIG. 1.
Figure 4:
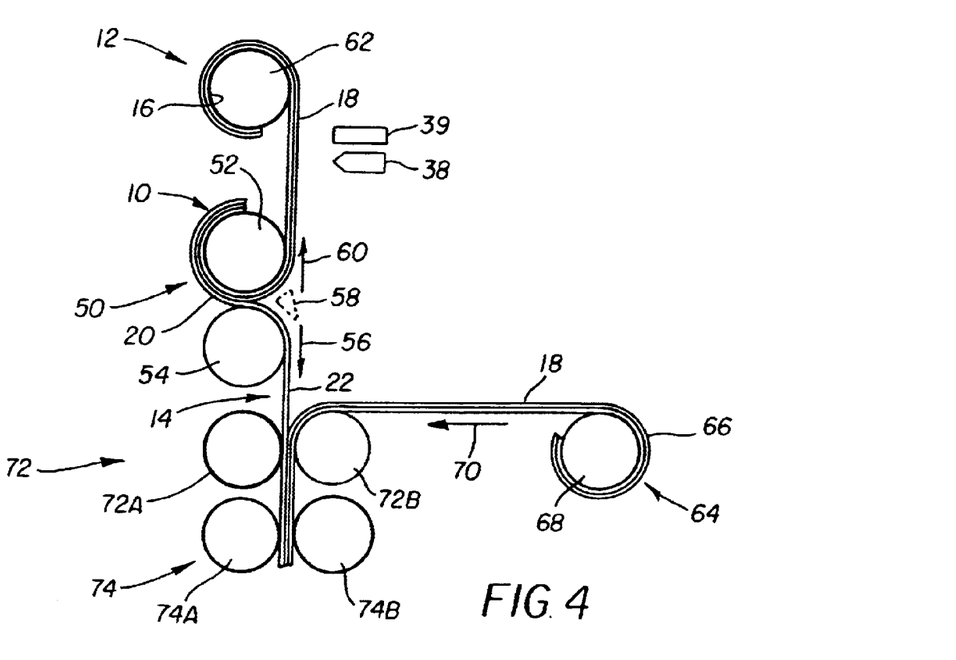
FIG. 4 is a schematic diagram of a third embodiment showing a manufacturing process useable with the material of FIG 1.

Referring to FIGS. 3–5, additional example embodiments of manufacturing processes useable with the material web 10 are shown with like elements being described using like reference symbols. Both processes shown in FIGS. 3 and 4 operate using sets of material rolls 10 and 64 in tandem, as described below.

The process begins with the unwinding of material web 10 from a parent roll 50 (alternatively referred to as a first recording element 12 and the transferable laminate 14) positioned around a roller 52. The transferable laminate 14 is removed (peeled, etc.) from the unimaged image receiving layer 18 of the parent roll 50 (now, the first recording element 12 without the transferable laminate 14) and caused to travel around roller 54 in the direction indicated by arrow 56. In this configuration, protective layer 20 provides protection to the image receiving layer 18 of the parent roll 50 (the first recording element 12) prior to printing on the image receiving layer 18 of the parent roll 50 (the first recording element 12). In some applications, it may be beneficial to include a removal device 58 (knife, blade, wedge, etc.) to assist with the removal of the transferable laminate 14 from the image receiving layer 18 of the parent roll 50. The first recording element 12 of the parent roll 50 is caused to travel in the direction indicated by arrow 60 and is rewound around roller 62.

A daughter roll 64 of a second recording element 66 is unwound around roller 68. The daughter roll 64 of the second recording element 66 can be a roll of a former first recording element 12. Alternatively, the daughter roll 64 of the second recording element 66 can be a roll of a recording element comprised of support 16 and image receiving layer 18 having no transferable laminate 14. This would commonly occur at the start of a printing process when a new parent roll 50 and a new daughter roll 64 were being used. The second recording element 66 travels past one or more print stations 38 in the direction indicated by arrow 70. Here, image receiving layer 18 receives ink (forming an image) from the one or more printheads (not shown) positioned at each print station 38. Typically, print station(s) 38 will have inkjet printheads. However, other types of printheads can be used, for example, dye sublimation printheads, laser printheads, etc. After traveling past print station(s) 38, the second recording element 66 can optionally travel past a drying zone(s) 39. Drying zone(s) 39 can be any type known in the industry, for example, heat lamps, ultraviolet dryers, infrared dryers, etc.

After printing on the daughter roll 64, transferable laminate 14 from parent roll 50 is caused to contact the imaged image receiving layer 18 of the daughter roll 64 as the laminate 14 and the second recording element 66 travel through a laminator assembly 72 (for example, a heated roller assembly 72A and 72B). Here, the temperature of the rollers causes the thermally activated adhesive layer 22 of the transferable laminate 14 of the parent roll 50 to adhere itself to the surface of the image receiving layer 18 of the daughter roll 64 such that the protective layer 20 of the transferable laminate 14 becomes non-removable, described in more detail below. As such, the second recording element 66 of the imaged daughter roll 64 is laminated with the protective layer 20 of the transferable laminate 14 of the parent roll 50. Alternatively, the laminator assembly 72 can be a pressure roller assembly provided the adhesive layer 22 is a pressure activated adhesive layer, as described above with respect to FIG. 2.

After the permanently laminated daughter roll 64 leaves the laminator assembly 72, the daughter roll 64 passes through a cutter assembly 74 which makes a perforated cut perpendicular (or parallel) to the longitudinal axis of the daughter roll 64 at predetermined intervals. These cuts are sufficient to permit easy separation of individual pictures, images, documents, etc. by manual or automated processes. The cutter assembly 74 can be a two roller system in which cuts are made by cutting wheel 74B from the bottom of the daughter roll 64 as the daughter roll 64 is pressed against pressure wheel 74A. Cutter assembly 74 can be positioned either parallel or perpendicular to the material web 10. Alternatively, any known perforating, cutting, or scoring assembly may be used as well as any method for defining when the cuts are made to the daughter roll 64.

The thermally activated adhesive layer 22 and the protective layer 20 of the laminate 14 can be the types described above provided the thermally activated adhesive layer 22 is of the type that is initially removable but can be caused to become non-removable using suitable means. Additionally, when the daughter roll 64 and the parent roll 50 are exhausted, the first recording element 12 of the parent roll 50 becomes a new (fresh, etc.) daughter roll 64 and a new parent roll replaces the exhausted parent roll 50. The process is then repeated as many times as is necessary.

Referring to FIG. 4, printing can alternatively take place on the image receiving layer 18 of the first recording element 12 from the parent roll 50. The imaged image receiving layer 18 of the parent roll 50 is then laminated when it becomes the daughter roll 64.

The recording element 12 will now be described in more detail.

Recording element 12 can be any known recording element, for example, one that employs porous or non-porous single layer or multilayer coatings that act as suitable image receiving or ink receiving layers on one or both sides of the support 16. Porous recording elements have been developed which provide nearly instantaneous drying as long as they have sufficient thickness and pore volume to effectively contain the liquid ink. Representative porous recording elements are disclosed in U.S. Pat. Nos. 6,087,051; 6,037,050; 5,750,200; 5,576,088 and 5,264,275.

Recording elements 12 that employ non-porous single layer or multilayer coatings predominantly containing hydrophilic polymer and little, if any, particles can also be used. Typically, hydrophilic polymer layers absorb and retain ink through swelling. Aqueous liquids flow into such a layer by molecular diffusion and not by capillary action as would occur in a porous layer. Typical hydrophilic polymers include those listed below. Examples of non-porous recording elements have been disclosed in U.S. Pat. Nos. 6,045, 917 and 5,789,070.

The at least one image receiving layer 18 can also be any known type of image receiving layer, for example, porous image receiving layers typically containing from about 50% to about 95% particles. Typical particles include silica, alumina, titania, zircona, clay, calcium carbonate, barium sulfate or organic particles such as polymeric beads. Examples of organic particles are disclosed in at least U.S. Pat. No. 6,364,477. Porous image receiving layers can also contain fusible or partially fusible organic particles as disclosed in U.S. Pat. No. 4,785,313. Additionally, porous image receiving layers typically containing from about 5% to about 80% hydrophilic polymer as binder can also be used. Examples of hydrophilic polymers include poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Porous image receiving layers can also contain polymer micro-porous structures without particles as disclosed in U.S. Pat. Nos. 5,374,475 and 4,954,395.

To improve image quality and stability, mordants, UV absorbers, radical quenchers or antioxidants can also be added to the at least one image receiving layer 18 as is well known in the art. Other additives include pH modifiers, adhesion promoters, crosslinkers, rheology modifiers, surfactants, biocides, lubricants, colorants, optical brighteners, matte agents, antistatic agents, etc. In order to obtain adequate coatability, additives known to those familiar with such art such as surfactants, defoamers, alcohol and the like can be used.

The thickness of the image receiving layer 18 can range from about 1 to about 60 $\mu$m, preferably from about 5 to about 40 $\mu$m. The coating thickness required is typically determined through the need for the coating to act as a sump for absorption of ink solvent and the need to hold the ink near the coating surface.

In addition to the image receiving layer 18, the recording element 12 can also contain a base layer (not shown), next to the support 16, the function of which is to absorb the solvent from the ink. Materials useful for this layer include inorganic particles and polymeric binder. The recording element 12 can also contain a layer on top of the image-receiving layer, the function of which is to provide gloss. Materials useful for this layer include sub-micron inorganic particles and/or polymeric binder.

The support 16 for the recording element 12 can be any of those usually used for inkjet recording elements 12, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint.

Additionally, support 16 can have a thickness of from about 50 to about 500 $\mu$m, preferably from about 75 to 300 $\mu$m. Antioxidants, antistatic agents, plasticizers and other known additives can be incorporated into the support 16, if desired.

The coating composition can be applied from either water or organic solvents to one or both support 16 surfaces through conventional pre-metered or post-metered coating methods such as blade, air knife, rod, roll, curtain, slide, bead, or extrusion coating, etc. The choice of coating process would be determined from the economics of the operation and in turn, would determine the formulation specifications such as coating solids, coating viscosity, and coating speed. After coating, the recording element 12 can be subject to calendering or supercalendering to enhance surface smoothness.

The following describes representative example(s) of materials and processes suitable for use with the present invention.

EXAMPLES

Construction of a Protected Recording Element

Samples were prepared by contacting the image receiving layer of an inkjet recording element, comprising a resin coated support having thereon a polyvinyl alcohol image receiving layer, to the heat activated adhesive layer of a series of commercial film laminates: (1) GBC Octiva Lo-Melt Glossy 3 mil.,(2) Glenroy ½ Digital Imaging Laminate, (3) Transilwrap ½ Trans-Kote® DigiKote™ Laminating Film, (4) Transilwrap (50/20) PET/MR Clear Laminating film, to form the corresponding series of composites, #1–#4.

Samples of the above composites were laminated using a Seal® Image® 400 Laminator (Hunt Corp.) with a nip setting of 0 and at a series of roller temperatures. Subsequent to lamination, the peel force for each of the above composites was determined using an Instron Model 1122 Electromechanical Test System (INSTRON/Satec Systems). For each composite, the laminate was peeled from the image receiving layer at 180 degrees and a peel rate of 10 cm/min. After obtaining a steady peel force (usually within 1–3 mm after the test was begun), the average peel force in N/m was determined from readings obtained over 2–5 mm. The results are shown in Table 1 below.

TABLE 1

| | Peel Force (N/m) | | | | | | | | | | | |
|---|---|---|---|---|---|---|---|---|---|---|---|---|
| # | 52° C. | 57° C. | 60° C. | 63° C. | 66° C. | 71° C. | 77° C. | 79° C. | 85° C. | 91° C. | 99° C. | 104° C. |
| 1 | 6.8 | 25 | 56 | 228 | 580 | — | — | — | 850 | — | — | — |
| 2 | .23 | 5.9 | 20 | 94 | 141 | 189 | — | — | 425 | — | — | — |
| 3 | — | .93 | .81 | 1.1 | 2.1 | 17 | 30 | — | 280 | — | — | — |
| 4 | — | — | — | — | — | — | 4.3 | 8.3 | 58 | 134 | 240 | 654 |

The peel force is the force required to peel the laminate from the surface of the image receiving layer of the inkjet recording element. In general, the higher the peel force, the harder it is to remove the laminate from the image receiving layer. If the peel force is greater than about 175 N/m, then the recording element is considered permanently protected by the laminate under typical viewing conditions, and the laminate cannot be removed without damaging the image receiving layer.

The above results show that the level of adhesion is adjustable ranging from non-adherent, through increasing tack, to permanently adhered, depending upon the applied heat and/or pressure. The above results also show that the peel force varies depending on the type of adhesive used. As such, the peel force can be allowed to vary (less than 175 N/m, greater than 175 N/m) depending on the particular application, as long as the laminate is adherable to the unimaged image receiving layer under normal working conditions and operating environments and removable from the unimaged image receiving layer without damaging the image receiving layer.

Production Process

Composite #1 was constructed as described above and laminated at 57° C. thereby creating a parent roll of the invention having a transferable laminate layer and a peel force of 25 N/m. Thus, the transferable laminate was easily removable from the image receiving layer.

A pair of material rolls, as described above, were used in tandem. A starter roll without the adhered laminate was used as the first daughter roll, and was printed using an inkjet printer. As the daughter roll was being printed, the laminate of the parent roll from composite #1 was removed at room temperature using a peel force of 25 N/m. The adhesive layer of the laminate was then placed in contact with the imaged image receiving layer of the daughter roll, and the resulting composite passed through the heated nip of the laminator at 91° C. The peel force required to remove the laminate from the imaged image receiving layer was 298 N/m. Because the peel force was well above 175 N/m, the laminate is considered to be permanently adhered to the image receiving layer under typical viewing conditions and could not be removed from the image receiving layer without damaging the imaged image receiving layer.

The invention has been described in detail with particular reference to certain example embodiments thereof, but it will be understood that variations and modifications can be effected within the scope of the invention.

What is claimed is:

1. A method of producing a laminated image on a receiver comprising:
   providing a recording element comprising an unimaged image receiving layer having a removable laminate adhered to the unimaged image receiving layer; and
   transferring the removable laminate to an imaged image receiving layer.

2. The method according to claim 1, wherein transferring the removable laminate to the imaged image receiving layer comprises:
   removing the laminate from the unimaged image receiving layer;
   printing an image on the unimaged receiving layer such that the unimaged receiving layer becomes the imaged image receiving layer; and
   causing the laminate to contact the imaged image receiving layer.

3. The method according to claim 1, wherein transferring the removable laminate to the imaged image receiving layer comprises:
   removing the laminate from the unimaged image receiving layer of the recording element;
   providing a second recording element comprising an unimaged image receiving layer;
   printing an image on the unimaged receiving layer of the second recording element, wherein the unimaged receiving layer of the second recording element becomes the imaged image receiving layer of the second recording element; and
   causing the laminate to contact the imaged image receiving layer of the second recording element.

4. The method according to claim 1, further comprising:
   causing the laminate to become non-removable after the laminate has been transferred to the imaged image receiving layer.

5. The method according to claim 4, wherein causing the laminate to become non-removable after the laminate has been transferred to the imaged image receiving layer comprises applying heat to the laminate.

6. The method according to claim 4, wherein causing the laminate to become non-removable after the laminate has been transferred to the imaged image receiving layer comprises applying pressure to the laminate.

7. The method according to claim 4, further comprising:
   cutting the laminate and the imaged image receiving layer after the laminate has become non-removable.

8. The method according to claim 1, wherein the laminate includes a protective layer and an adhesive layer, the adhesive layer contacting the unimaged image receiving layer.

9. The method according to claim 8, wherein transferring the laminate to the imaged image receiving layer includes contacting the adhesive layer to the imaged image receiving layer.

10. The method according to claim 9, further comprising:
    causing the laminate to become non-removable after the laminate has been transferred to the imaged image receiving layer.

11. The method according to claim 10, wherein causing the laminate to become non-removable after the laminate has been transferred to the imaged image receiving layer comprises applying heat pressure to the laminate such that the adhesive layer of the laminate becomes non-removable.

12. The method according to claim 11, wherein causing the laminate to become non-removable after the laminate has been transferred to the imaged image receiving layer comprises applying pressure to the laminate such that the adhesive layer of the laminate becomes non-removable.

13. The method according to claim 10, wherein causing the laminate to become non-removable after the laminate has been transferred to the imaged image receiving layer comprises applying pressure to the laminate such that the adhesive layer of the laminate becomes non-removable.

14. The method according to claim 1, wherein the removable laminate includes a protective layer and an adhesive layer having a first side and a second side, the first side of the adhesive layer contacting the protective layer, the second side of the adhesive layer contacting the unimaged image receiving layer.

15. The method according to claim 14, wherein transferring the protective laminate to the imaged image receiving layer includes contacting the second side of the adhesive layer to the imaged image receiving layer.

16. The method according to claim 15, further comprising:
causing the laminate to become non-removable after the laminate has been transferred to the imaged image receiving layer comprises applying heat to the laminate such that the second side of the adhesive layer of the laminate becomes non-removable.

17. The method according to claim 15, further comprising:
causing the laminate to become non-removable after the laminate has been transferred to the imaged image receiving layer comprises applying pressure to the laminate such that the second side of the adhesive layer of the laminate becomes non-removable.

18. The method according to claim 1, wherein transferring the removable laminate to the imaged image receiving layer comprises:
removing the laminate from the unimaged image receiving layer of the recording element;
printing an image on the unimaged image receiving layer of the recording element thereby creating a first imaged recording element;
providing a second imaged recording element comprising an imaged image receiving layer; and
causing the laminate to adhere to the imaged image receiving layer of the second imaged recording element.

19. The method according to claim 18, further comprising:
causing the first imaged recording element to become the second imaged recording element.

20. The method according to claim 18, wherein causing the laminate to adhere to the imaged image receiving layer of the second imaged recording element includes applying heat to the laminate.

21. The method according to claim 18, wherein causing the laminate to adhere to the imaged image receiving layer of the second imaged recording element includes applying pressure to the laminate.

22. A method of producing a laminated image on a receiver comprising:
providing a first recording element comprising an unimaged image receiving layer having a removable laminate contacting the unimaged image receiving layer;
providing a second recording element comprising an unimaged image receiving layer;
printing an image on the unimaged receiving layer of the second recording element, wherein the unimaged receiving layer of the second recording element becomes an imaged image receiving layer of the second recording element; and
transferring the laminate from the unimaged image receiving layer of the first recording element to the imaged image receiving layer of the second recording element.

23. The method according to claim 22, further comprising:
completing the transfer of the laminate of the first recording element to the second recording element, the first recording element becoming a new second recording element comprising an unimaged image receiving layer; and
replacing the second recording element with the new second recording element, wherein the unimaged image receiving layer of the new second recording element is ready to be imaged.

24. The method according to claim 23, further comprising:
providing a new first recording element comprising an unimaged image receiving layer having a removable laminate contacting the unimaged image receiving layer.

25. The method according to claim 22, further comprising:
causing the laminate to become non-removable after the laminate has been transferred to the imaged image receiving layer.

26. The method according to claim 25, wherein causing the laminate to become non-removable after the laminate has been transferred to the imaged image receiving layer comprises applying heat to the laminate.

27. The method according to claim 25, wherein causing the laminate to become non-removable after the laminate has been transferred to the imaged image receiving layer comprises applying pressure to the laminate.

28. The method according to claim 25, further comprising:
cutting the laminate and the second recording element after the laminate has become non-removable.

29. A method of producing a laminated image on a receiver comprising:
providing a parent recording element comprising an image receiving layer having a removable laminate contacting the image receiving layer;
providing a daughter recording element comprising an image receiving layer;
transferring the laminate from the image receiving layer of the parent recording element to an imaged image receiving layer of the daughter recording element.

30. The method according to claim 29, wherein the daughter recording element is a former parent recording element.

31. The method according to claim 29, wherein the daughter recording element includes only a recording element.

32. The method according to claim 29, wherein the parent roll is imaged after the laminate is removed from the parent recording element, prior to the parent recording element becoming the daughter recording element.

33. The method according to claim 29, wherein the daughter recording element is imaged prior to the laminate contacting the daughter recording element.

34. The method according to claim 29, further comprising:
    causing the laminate to become non-removable after the laminate has been transferred to the imaged image receiving layer.

35. The method according to claim 34, wherein causing the laminate to become non-removable after the laminate has been transferred to the imaged image receiving layer comprises applying heat to the laminate.

36. The method according to claim 34, wherein causing the laminate to become non-removable after the laminate has been transferred to the imaged image receiving layer comprises applying pressure to the laminate.

37. The method according to claim 34, further comprising:
    cutting the laminate and the daughter recording element after the laminate has become non-removable.

* * * * *